Aug. 18, 1931.  E. C. BALLMAN  1,819,013
ALTERNATING CURRENT MOTOR
Filed Feb. 12, 1926
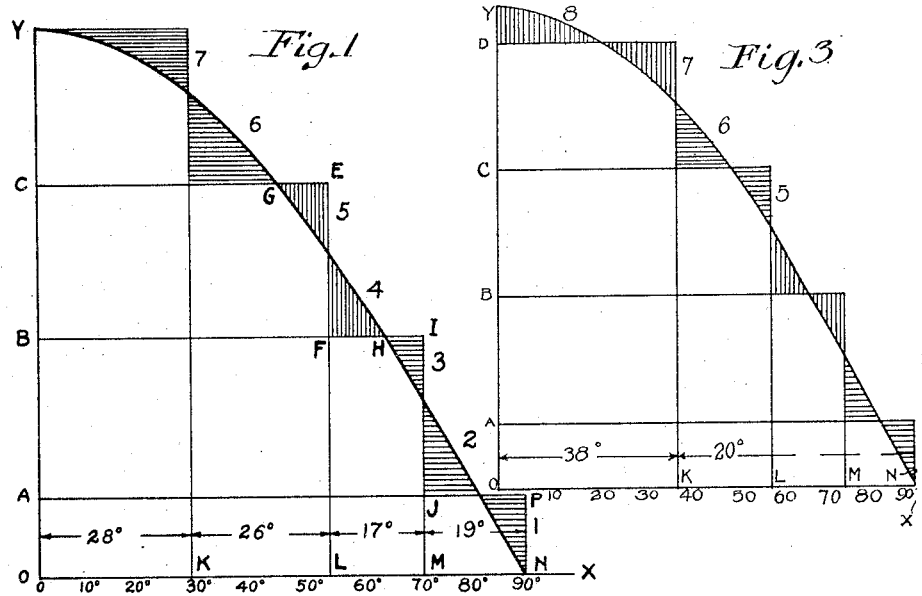
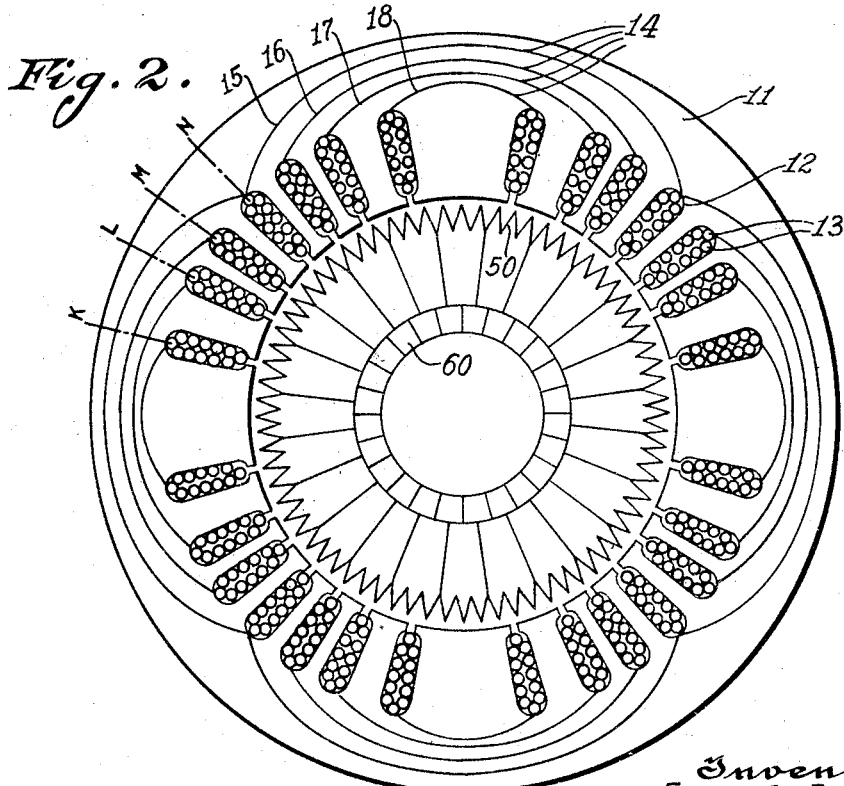
Inventor:
EDWIN C. BALLMAN,
By John H. Bruninga
His Attorney.

Patented Aug. 18, 1931

1,819,013

UNITED STATES PATENT OFFICE

EDWIN C. BALLMAN, OF ST. LOUIS, MISSOURI

ALTERNATING CURRENT MOTOR

Application filed February 12, 1926. Serial No. 87,854.

This invention pertains to electric motors and more particularly to alternating current motors, of the single phase type.

Practically all types of single phase motors operate, after they have attained full speed, with the rotor short circuited. This produces what is in effect practically a squirrel cage rotor. It is a well known fact that a squirrel cage rotor even in the single phase type of motor has the effect of smothering or eliminating the higher harmonics of the alternating current wave so as to produce in effect a magneto-motive force which has almost a pure sine distribution. In a single phase motor it is of highest importance that this counter magneto-motive force of the secondary be balanced by a primary magneto motive force having the same distribution. When such is not the case the differences in distribution are smoothed out by leakage or stray fields which circulate usually about the primary winding. These stray fields not only have a disturbing effect upon the primary current by producing various harmonics of the fundamental wave, but they traverse the primary core so as to tend to produce saturation thereof. Such stray fields moreover, produce their own hysteresis and eddy current losses. Since these stray fields are often of higher harmonic frequency, the losses produced thereby are correspondingly greater.

If the secondary magneto motive force, which is usually of nearly pure sine distribution, is balanced by a primary magneto motive force having the same distribution, these stray fields will not be set up. Consequently, the iron losses which are produced by these fields are eliminated and the primary current is reduced both in its magnetizing component and in its energy component since both the magnetizing and the iron loss effects of the stray fields are absent.

One of the objects of this invention, therefore, is to provide a single phase motor in which the primary magneto motive force may be adjusted to balance the secondary counter magneto motive force.

Another object is to provide such a motor in which the primary magneto motive force may be given a nearly true sine distribution.

Another object is to so arrange the stator slots by proper spacing thereof or otherwise so as to produce a magneto motive force of nearly pure sine distribution.

Another object is to provide such a motor having a primary member in which a sine distribution of magneto motive force may be obtained with a winding of ordinary design.

Further objects will appear from the following detail description taken in connection with the accompanying drawings, in which:

Figure 1 is a diagram illustrating the method of determining the primary winding in accordance with this invention.

Figure 2 is a diagrammatic representation of a motor as in Figure 1, and

Figure 3 is a diagram similar to Figure 1 but illustrating another embodiment of this invention.

Referring to the accompanying drawings 11 designates the stator core or punching which is provided with slots 12 in which conductors 13 are embedded in any manner well known in the art. These conductors may be wound into coils of standard form whose free ends are represented by the arcs 14. The winding illustrated in Figure 2 is a simple one of the so-called concentric type. In this type of winding that part embracing each magnetic pole is formed into a series of concentric coils usually oval in shape, the sides of which are embedded in the slots while the free ends form arcs bridging from slot to slot as illustrated in Figure 2. In this Figure 50 designates the secondary winding which may be of any type whatever well known in the art and which is shown as connected to a commutator 60 which is understood to be short-circuited as soon as the motor attains its running speed. In the representation of Figure 2, each slot contains the same number of conductors while the slots themselves are spaced angularly about the stator in accordance with a plan which will now be outlined.

Figure 1 represents a graph of the field distribution in which vertical distances represent the intensity of magneto motive force while horizontal distances from the zero point represent distances in electrical degrees along the air gap of the motor measuring from the pole center. The curve NY represents the desired sine distribution of magneto motive force. The stepped curve represents the stepped distribution of magneto motive force produced by the several coils embracing one pole. For instance, the distance OA represents the magneto motive force produced by the outside coil 15 of one pole. According to the ordinary practice in such a winding this will be a half coil. That is, it will have only half the number of turns of the other coils and will occupy half of each slot in which it lies. A similar half coil spanning the adjacent pole will occupy the other half of each of these slots. As this coil embraces the full pole pitch, it is represented in the diagram in Figure 1 as extending through 90 electrical degrees, this figure showing only one half of the field of one pole. The height AB in this diagram represents the magneto motive force produced by the second coil 16. This magneto motive force is added to that of the coil 15, or to OA in the diagram, over that portion of the pole face included between the slots in which this coil lies. Similarly the height BC represents the magneto motive force of the third coil 17, which again is added to OA and AB over that portion of the pole face embraced by its coil. Similarly CY represents the magneto motive force produced by the inner coil 18 and is added in a similar manner to that of the other coils. This building up of the magneto motive forces of the several coils produces the stepped curve shown in Figure 1. The purpose of this invention is to so proportion the steps of this curve that it will deviate to a minimum extent from the sine curve NY.

If the distances from the axis OY to each of the vertical lines of this stepped curve are made such that the area of the triangular area 7 is the same as the area of the triangular area 6, and similarly triangle 5 is equal to triangle 4, and triangles 3 and 1 are together made equal to triangle 2, then the area of the stepped curve will be equal to the area of the sine curve very nearly. This means that the total magneto motive force of the stepped curve will be practically the same as that of a pure sine distribution in accordance with the curve NY. By making these triangles equal as outlined above the actual distribution will deviate to a minimum extent from the desired sine distribution.

In laying out this winding the maximum value OY of the desired magneto motive force is divided into three full coil sections AB, BC, and CY and a half coil section OA corresponding to the number of coils desired in the winding. This gives the location of the points A, B and C along the line OY. Horizontal lines may then be drawn through these points so as to intersect the curve NY. The positions of the vertical lines are then selected in such a way as to make the triangles equal as outlined above. This then gives the distances of the points K, L, M and N in electrical degrees from a pole center. The position of each of these lines represents the position of a slot in the stator core, and it will be particularly observed that the slot which contains the outermost coil 15 of each pole has its center disposed at the point of zero polar flux. The corresponding slots are lettered in Figure 2 to agree with the lettering of the lines which fix their location.

Figure 3 illustrates a modification of the same method outlined above. In this case, it is desired to make the triangle 1 equal to the triangle 2, 3 equal to 4, 5 equal to 6 and 7 equal to 8. In this case the point D on the line OY is assumed and the distance OD is divided in accordance with the number and size of the coils as described for dividing the distance OY in Figure 1. The same construction is then carried out, the positions on the vertical lines being selected so as to make triangle 1 equal triangle 2, etc., as just described. If there results a considerable difference between the areas of the triangles 7 and 8 a new point D must be selected and the construction repeated until these areas come out equal within the permissible error.

It will be noted that in accordance with this construction not only is the area of the stepped distribution curve substantially equal to the area of the sine curve, but the areas of the successive steps of the stepped curve are equal to the area of the corresponding increment of the sine curve. For instance, the area B, C, E, and F, Fig. 1, is equal to the area B, C, G, H of the sine curve. Similarly, the area O, B, I, J, P, N of the stepped curve is equal to the area O, B, H, N of the sine curve. In Figure 3 the area of that section of the step curve which represents the magnetic motive force acting on a single tooth, as for instance the area between the vertical lines K and L, is the same as the area of the sine curve included between those two lines. Accordingly, the magneto motive force which is actually impressed on each tooth will be the same as that which would act on that tooth under the theoretical sine distribution.

In the winding described all of the slots contain the same number of conductors. This is a desirable arrangement since it permits uniform size for all the slots and also a uniform size of coil, the distribution being taken care of by the spacing of the slots. It is, of course, also a practice to vary both the spacing and the size of the slots, with a corresponding variation in the number of conductors, in order to obtain an approach to the sine distribution. This, however, makes a somewhat more complex problem.

It will be seen, therefore, that in accordance with this invention a motor is provided in which a magnetic distribution is obtained which deviates to a minimum extent from a pure sine distribution having the same pole pitch. The actual total magneto motive force active is practically equal to that of the theoretical sine distribution. The various steps of the actual stepped distribution are substantially equal to the corresponding increments of the pure sine distribution. This, therefore, represents as close an approach to the theoretical sine distribution as can be obtained practically with a winding embedded in slots in the stator core.

A motor equipped with such a winding, therefore, will produce a primary magnetomotive force of such distribution as more nearly to balance the counter magneto motive force of the short-circuited secondary. Consequently, a decided reduction in iron loss of the motor may be obtained by this method. In practice an actual reduction of as much as 25% has been obtained. This, of course, is an important factor in the performance of a motor particularly in certain types of small motors which must run almost continuously and in which an excessive loss will be extended over a long period of time and thus add to the cost of operation of the motor.

It is obvious that various changes may be made in the details of construction without departing from the spirit of this invention; it is, therefore, to be understood that this invention is not to be limited to the specific details shown and described.

Having thus described the invention, what is claimed is:—

1. In an alternating current motor, a primary member having spaced slots therein and a winding in said slots arranged in coils to produce magnetic poles with stepped distribution of flux, the spacings of the inner slots varying progressively from the pole centers outwardly to produce a polar flux deviating from sine distribution by substantially equal positive and negative increments.

2. In an alternating current motor, a primary member having spaced slots therein and a winding in said slots arranged in coils to produce magnetic poles with stepped distribution of flux, each slot having an equal number of conductors and the pitch of each coil being proportioned with reference to the turns therein to produce its part of the polar flux deviating from sine distribution by substantially equal positive and negative increments.

3. In an alternating current motor, a primary member having spaced slots therein and a winding in said slots arranged in coils to produce magnetic poles with stepped distribution of flux, each slot having an equal number of conductors and the spacings of the inner slots varying progressively from the pole centers outwardly to produce a polar flux deviating from sine distribution by substantially equal positive and negative increments.

4. In an alternating current motor, a primary member having spaced slots therein and a winding in said slots arranged in coils to produce magnetic poles with stepped distribution of flux, the slots being of uniform size and the spacings of the inner slots varying progressively from the pole centers outwardly to produce a polar flux deviating from sine distribution by substantially equal positive and negative increments.

5. In an alternating current motor, a primary member having spaced slots therein and a winding in said slots arranged in coils to produce magnetic poles with stepped distribution of flux, the slots being of uniform size with an equal number of conductors in each slot and the spacings of the inner slots varying progressively from the pole centers outwardly to produce a polar flux deviating from sine distribution by substantially equal positive and negative increments.

6. In an alternating current motor, a primary member having spaced slots therein and a winding in said slots arranged in coils to produce magnetic poles with stepped distribution of flux, the slots being of uniform size with an equal number of conductors in each slot and the spacings of the inner slots varying progressively from the pole center outwardly.

In testimony whereof I affix my signature this 15th day of December, 1925.

EDWIN C. BALLMAN.